(12) United States Patent
Qiao et al.

(10) Patent No.: US 10,913,464 B1
(45) Date of Patent: Feb. 9, 2021

(54) INTELLIGENT ESCALATION STRATEGY FOR AUTONOMOUS VEHICLE

(71) Applicant: GM GLOBAL TECHNOLOGY OPERATIONS LLC, Detroit, MI (US)

(72) Inventors: Ningsheng Qiao, Troy, MI (US); Matthew R. Kirsch, Shelby Township, MI (US); Richard A. Weaver, Brighton, MI (US); Mark Gazda, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/599,866

(22) Filed: Oct. 11, 2019

(51) Int. Cl.
*G06F 3/01* (2006.01)
*B60W 50/14* (2020.01)
*B60W 40/09* (2012.01)
*G06K 9/00* (2006.01)

(52) U.S. Cl.
CPC ............ *B60W 50/14* (2013.01); *B60W 40/09* (2013.01); *G06K 9/00845* (2013.01); *B60W 2050/143* (2013.01); *B60W 2520/10* (2013.01); *B60W 2554/00* (2020.02); *B60W 2555/20* (2020.02)

(58) Field of Classification Search
CPC .............. B60W 50/14; B60W 40/09; B60W 2050/143; B60W 2520/10; G06K 9/00845; G06K 2554/00; G06K 2555/20
See application file for complete search history.

(56) References Cited

U.S. PATENT DOCUMENTS

| | | | |
|---|---|---|---|
| 2015/0061895 A1* | 3/2015 | Ricci | G06Q 10/20 340/902 |
| 2017/0313190 A1* | 11/2017 | Shimada | B60W 50/16 |
| 2018/0339712 A1* | 11/2018 | Kislovskiy | B60W 50/0205 |
| 2019/0023282 A1* | 1/2019 | Kuroda | H04S 1/00 |
| 2019/0281483 A1* | 9/2019 | Chalmer | H04W 24/10 |
| 2019/0367016 A1* | 12/2019 | Brannstrom | G06T 7/70 |
| 2020/0031365 A1* | 1/2020 | Marti | B60W 50/14 |
| 2020/0057487 A1* | 2/2020 | Sicconi | G06T 7/174 |

* cited by examiner

*Primary Examiner* — Munear T Akki
(74) *Attorney, Agent, or Firm* — Cantor Colburn LLP (57) ABSTRACT

An autonomous vehicle, system and method of operating an autonomous vehicle. The system includes a processor for operating an external condition awareness module, a driver driving behavior awareness module and an escalator module: The external condition awareness module is configured to determine an intelligent escalation factor based on an external condition of an environment and driving traffic conditions of the autonomous vehicle. The driver driving behavior awareness module is configured to generate a behavior disciplining factor based on a behavior history of a driver of the autonomous vehicle. The escalation module is configured to generate an escalation signal to alert the driver based on the intelligent escalation factor and the behavior disciplining factor, a driver attention level and a speed of the vehicle.

17 Claims, 6 Drawing Sheets

INTELLIGENT ESCALATION STRATEGY FOR AUTONOMOUS VEHICLE

INTRODUCTION

The subject disclosure relates to escalation strategies in semi-autonomous vehicles and, in particular, to an escalation strategy based on external conditions and a driver's level of attentiveness.

A partial automation or conditional automation vehicle is able to take some dynamic driving tasks from a human driver, but a human driver must still actively monitor the vehicle's progress and be ready to take over control of the vehicle entirely when conditions dictate. When the vehicle is operating in an autonomous mode, the driver may become distracted or drowsy. The vehicle needs to employ a strategy for bringing the driver's attention back to the road. Such strategies are called escalation strategies. Current escalation strategies use simple methods of alerting the driver based on the driver's relative attention level, regardless of the driving traffic situations and environmental conditions. As a result, these escalation strategies are prone to providing warnings that are either unnecessary or untimely. Accordingly, it is desirable to employ an escalation strategy that is adaptable to account for the driving traffic situations and environmental conditions of the vehicle as well as a level of attentiveness of the driver.

SUMMARY

In one exemplary embodiment, a method of operating an autonomous vehicle is disclosed. An intelligent escalation factor is determined based on an external condition of an environment and driving traffic conditions of the autonomous vehicle. A behavior disciplining factor is generated based on a behavior history of a driver of the autonomous vehicle. The behavior history of a driver should match the Driver facial ID. An escalation signal is generated to alert the driver based on the intelligent escalation factor and the behavior disciplining factor, a driver attention level and a speed of the vehicle.

In addition to one or more of the features described herein, a response of the driver to the escalation signal is monitored and the behavior disciplining factor is generated based on the behavior history of the driver to the escalation signal. The intelligent escalation factor is determined based on at least one of a traffic condition, a weather condition and a lighting condition. The escalation signal is generated by forming a product of the intelligent escalation factor and the behavior disciplining factor. A threshold for generating the escalation signal is multiplied by the product of the intelligent escalation factor and the behavior disciplining factor. The intelligent escalation factor and the behavior disciplining factor are updated on a periodic basis. The autonomous vehicle will shut down when the driver does not respond to the escalation signal for a pre-determined period of time after multiple incremental alert levels.

In another exemplary embodiment, a system for operating an autonomous vehicle is disclosed. The system includes a processor for operating an external condition awareness module, a driver driving behavior awareness module and an escalator module. The external condition awareness module is configured to determine an intelligent escalation factor based on an external condition of an environment and driving traffic conditions of the autonomous vehicle. The driver driving behavior awareness module is configured to generate a behavior disciplining factor based on a behavior history of a driver of the autonomous vehicle. The escalation module is configured to generate an escalation signal to alert the driver based on the intelligent escalation factor and the behavior disciplining factor, a driver attention level and a speed of the vehicle.

In addition to one or more of the features described herein, the system further includes a monitor configured to monitor a response of the driver to the escalation signal, wherein the driver awareness module generates the behavior disciplining factor based on the behavior history of the driver to the escalation signal. The system further includes at least one of a traffic conditions processor, a weather sensor and a lighting sensor for indicating the external condition to the external condition awareness module. The system further includes an escalation threshold multiplier configured to generate the escalation signal by forming a product of the intelligent escalation factor and the behavior disciplining factor. The escalation threshold multiplier multiplies a threshold for generating the escalation signal at the escalation module by the product of the intelligent escalation factor and the behavior disciplining factor, wherein the escalation threshold is a function of speed of the vehicle. The external condition awareness module updates the intelligent escalation factor and the driver driving behavior awareness module updates the behavior disciplining factor associated driver facial ID on a periodic basis. The processor is further configured to operate the autonomous vehicle to shut down when the driver does not respond to the escalation signal for a pre-determined period of time after multiple incremental alert levels.

In yet another exemplary embodiment, an autonomous vehicle is disclosed. The autonomous vehicle includes a processor for operating an external condition awareness module, a driver driving behavior awareness module and an escalation module. The external condition awareness module is configured to determine an intelligent escalation factor based on an external condition of an environment of the autonomous vehicle. The driver driving behavior awareness module is configured to generate a behavior disciplining factor based on a behavior history of a driver of the autonomous vehicle. The escalation module is configured to generate an escalation signal to alert the driver based on the intelligent escalation factor and the behavior disciplining factor, a driver attention level and a speed of the vehicle.

In addition to one or more of the features described herein, the vehicle further includes a monitor configured to monitor a response of the driver to the escalation signal, wherein the driver driving behavior awareness module generates the behavior disciplining factor based on the behavior history of the driver to the escalation signal. The vehicle further includes at least one of a traffic conditions processor, a weather sensor and a lighting sensor for indicating the external condition to the external condition awareness module. The vehicle further includes an escalation threshold multiplier configured to generate the escalation signal by forming a product of the intelligent escalation factor and the behavior disciplining factor as well as the speed of the vehicle. The escalation threshold multiplier multiplies a threshold for generating the driver escalation signal at the escalation module by the product of the intelligent escalation factor and the behavior disciplining factor, wherein the escalation threshold a function of the speed of the vehicle. The external condition awareness module updates the intelligent escalation factor and the driver driving behavior awareness module updates the behavior disciplining factor on a periodic basis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
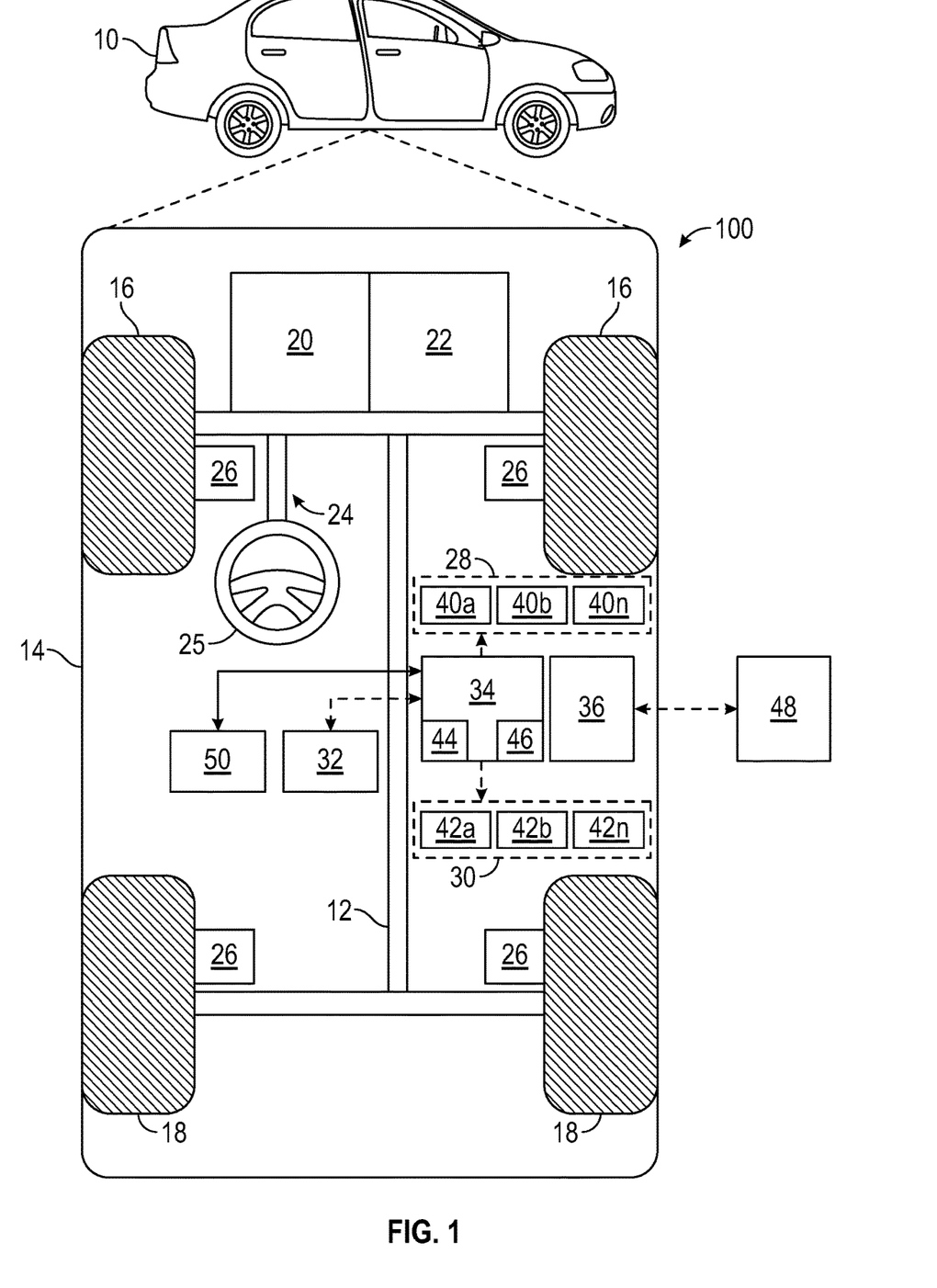
FIG. 1 shows a vehicle in accordance with an embodiment.

In accordance with an exemplary embodiment, FIG. 1 shows a vehicle 10. In an exemplary embodiment, the vehicle 10 is a partial automation or conditional automation vehicle. In various embodiments, the vehicle 10 includes at least one driver assistance system for both steering and acceleration/deceleration using information about the driving environment, such as adaptive cruise control and lane-centering. While the driver can be disengaged from physically operating the vehicle 10 by having his or her hands off the steering wheel and foot off the pedal at the same time, the driver must be ready to take control of the vehicle.

The vehicle 10 includes an associated trajectory planning system 100 shown generally in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, a data storage device 32, a controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The sensing devices 40a-40n can further include cameras and monitors that observe the driver and provide an indication of a condition of the driver to the vehicle 10. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the trajectory planning system 100 and, when executed by the processor 44, generates a trajectory output. The instructions can further include one or more instruction for performing an intelligent escalation strategy based on various external parameters and a behavior or attentiveness of a driver, as discussed herein.

The vehicle 10 further includes a driver monitoring system 50 which provides driver attention state for control of an escalation strategy with respect to a driver or occupant. The driver monitoring system 50 can either be a process operating at the controller 34 or a separate module, the escalation strategy may reside in the controller 34 as shown in FIG. 1.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. The communication system 36 can be used to receive information such as high definition maps which employ crowd-sourced GPS data and data obtained using precision LiDAR surveyed techniques.

Figure 2:
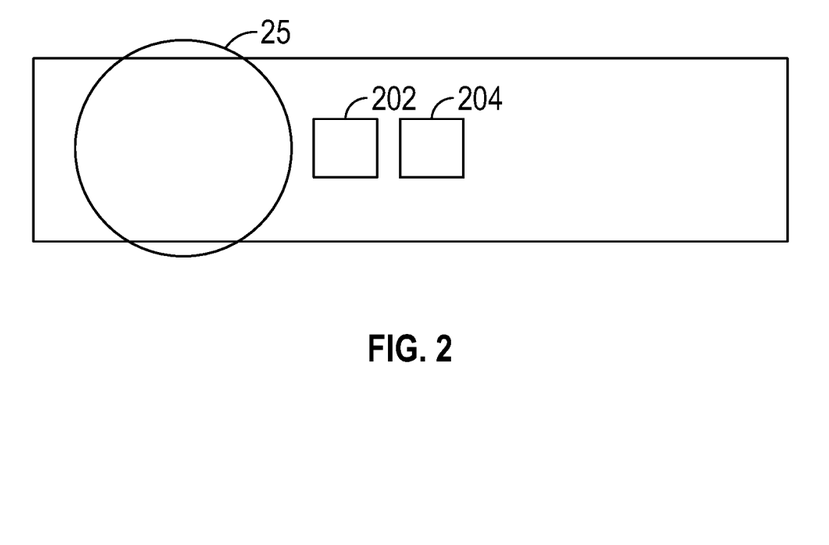
FIG. 2 shows a dashboard for the vehicle of FIG. 1 in an embodiment.

FIG. 2 shows a dashboard 200 for the vehicle 10 in an embodiment. The dashboard 200 includes the steering wheel 25 and a warning device 202 for escalating control of the vehicle 10 to the driver. The warning device 202 can include various alarms, lights, haptic interfaces, etc. for alerting the driver or bringing the driver's attention to the vehicle 10. The dashboard 200 further includes a driver monitor 204 for determining a level of awareness or attentiveness of the driver, including the ability of the driver to respond to warning signals presented by the warning device 202. The driver monitor 204 can include various input devices, such as a camera, an eye scanner, a facial identification device, a biofeedback monitor, etc. The driver monitor 204 tracks the eyes of the driver in order to determine a driver's attention state or attention level with respect to the surrounding road conditions.

Figure 3:
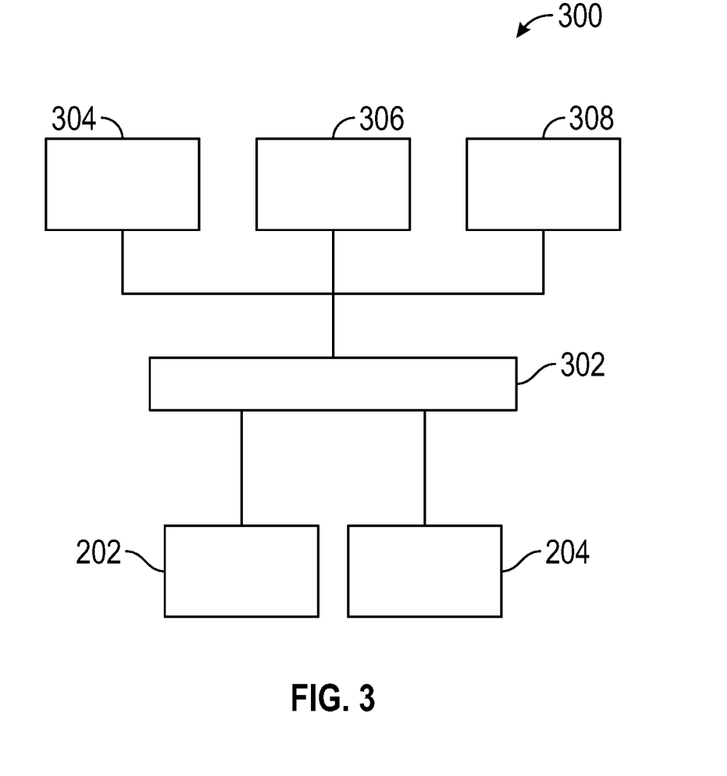
FIG. 3 shows a schematic diagram of an escalation control system for performing an escalation strategy.

FIG. 3 shows a schematic diagram of an escalation system 300 for performing an escalation strategy or otherwise notifying the driver of a need to take control of the vehicle 10. The escalation strategy can include sending various signals and various reminder signals, changing a frequency of the signals, volume or intensity of the signals, etc. in an attempt to get the attention of the driver. In the case of no response from the driver after several escalations, the "autonomous mode" can stop the vehicle 10.

The escalation system 300 includes an escalation control system 302 that controls various aspects of the escalation strategy. The escalation control system 302 can operate on processor 44 or a separate processor in various embodiments. The escalation control system 302 receives various parameters as input and determines an escalation strategy based on the input. The parameters include various external parameters regarding the environmental conditions surrounding the vehicle and one or more behavior parameters indicative of a level of awareness of the driver when the vehicle is operating in autonomous mode. The external parameters are provided to the escalation control system 302 by at least one of a traffic conditions processor 304, a weather sensor 306 and a lighting sensor 308. The driver driving behavior history parameters are provided to the escalation control system 302 based on the driver's escalation history which is stored in escalation control system.

The traffic conditions processor 304 processes traffic data regarding the traffic surrounding, or in an immediate vicinity, of the vehicle to the escalation control system 302. The traffic conditions processor 304 can use the signals from one or more data sources for determining traffic conditions, such as radar, Lidar, lane centering controls, "V2V" communication, High Definition Maps, Crowd Sourced GPS data, etc. Additionally, or alternatively, the traffic conditions processor 304 can include a receiver that receives traffic data transmitted to the traffic conditions processor 304 from a remote location.

The weather sensor 306 sends weather data for the vehicle to the escalation control system 302. The lighting sensor 308 sends light conditions data for the vehicle to the escalation control system 302. Similar to the traffic conditions processor 304, the weather sensor 306 and lighting sensor 308 can be sensors and/or receivers that receiver relevant data transmitted from a remote location.

The escalation control system 302 determines the escalation strategy based on the external parameters and the driver driving behavior history parameters which are stored in the escalation control system 302. The escalation strategy can change based on the type of external parameters and the driver driving behavior history parameters and any changes in these parameters. As part of the escalation strategy, the escalation control system 302 sends an escalation signal or warning signal to the driver through the warning device 202 and monitors the driver's behavior or response to the warning signal through the driver monitor 204. The escalation control system 302 can modify the escalation strategy based on changes to either the external parameters or the driving behavior history parameters of the driver.

Figure 4:
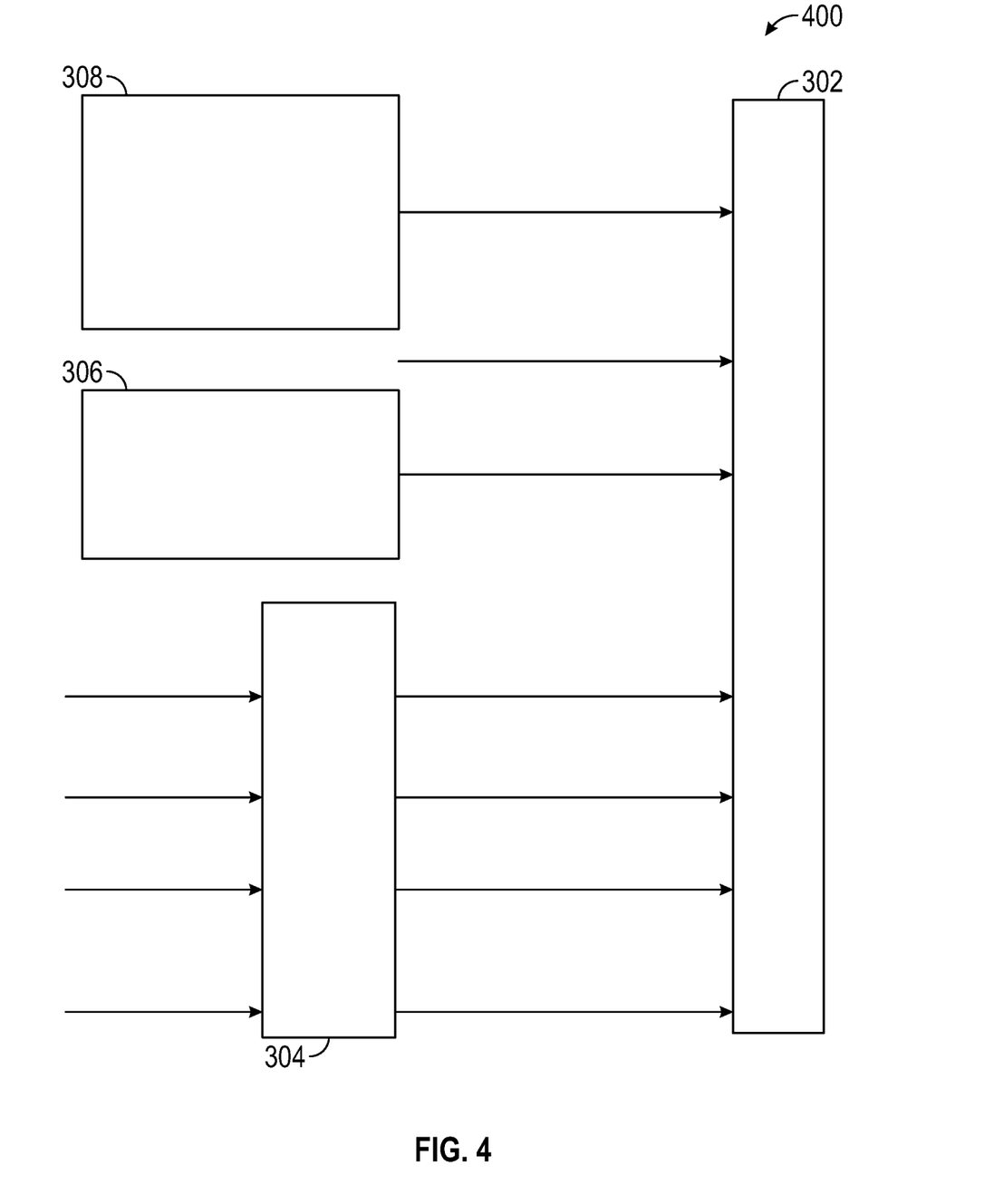
FIG. 4 shows a diagram illustrating details of operation of the escalation control system, a traffic conditions processor, a weather sensor and a lighting sensor.

FIG. 4 shows a diagram 400 illustrating details of operation of the escalation control system 302, the traffic conditions processor 304, weather sensor 306 and lighting sensor 308. The traffic conditions processor 304 receives various inputs regarding traffic conditions, which can include conditions regarding surrounding vehicles as well as the conditions of oncoming road sections. For example, the traffic conditions processor 304 can receive or determine data regarding surrounding or nearby target vehicles or target objects, thereby providing an awareness of objects in its environment. Additionally, the traffic conditions processor 304 can obtain data regarding its own location on the road. A right lane sensor can determine a distance to a right lane marker. A left land sensor can determine a distance to a left lane marker. Additionally, road metadata or road conditions can be provided to the traffic conditions processor 304 from a remote location. The traffic conditions processor 304 thereby sends one or more traffic parameters to the escalation control system 302. For example, the traffic conditions processor 304 can send data regarding the traffic in an adjacent lane. With respect to traffic in a lane to a left of the vehicle, a value of an Adjacent Lane Traffic State Left parameter can be selected from a set such as {heavy, light, no traffic}. With respect to traffic in a lane to a right of the vehicle, a value of an Adjacent Lane Traffic State Right parameter can be selected from a set such as {heavy, light, no traffic}. Based on the distances to the left and right lane markers, a value of a Land Control Parameter OK parameter can be selected from a binary set of {True, False}. Based on the road metadata or road conditions from High Definition Maps, Crowd Sourced GPS data, etc., a value of an Ahead Traffic State parameter can be selected from a set such as {Heavy, Light, Construction/Obstacle/Porthole, Exit/Entry, No Traffic}. The sets and parameters discussed herein are for illustrative purposes and not meant to be a limitation on the invention.

The weather sensor 306 can send a weather state parameter to the escalation control system 302. Exemplary values of the weather state parameter can be selected from a set such as {clear weather, fog, snow, rain}. The lighting sensor 308 can send a lighting state parameter to the escalation control system 302. Exemplary values of the lighting state parameter can be selected from a set such as {unknown, day, dawn/dusk, pre-dawn/post dusk; night/lit, night/unlit}. Additionally, lighting data from a local lighting sensor can be received at the escalation control system 302. The sets and parameters discussed herein are for illustrative purposes and not meant to be a limitation on the invention.

Figure 5:
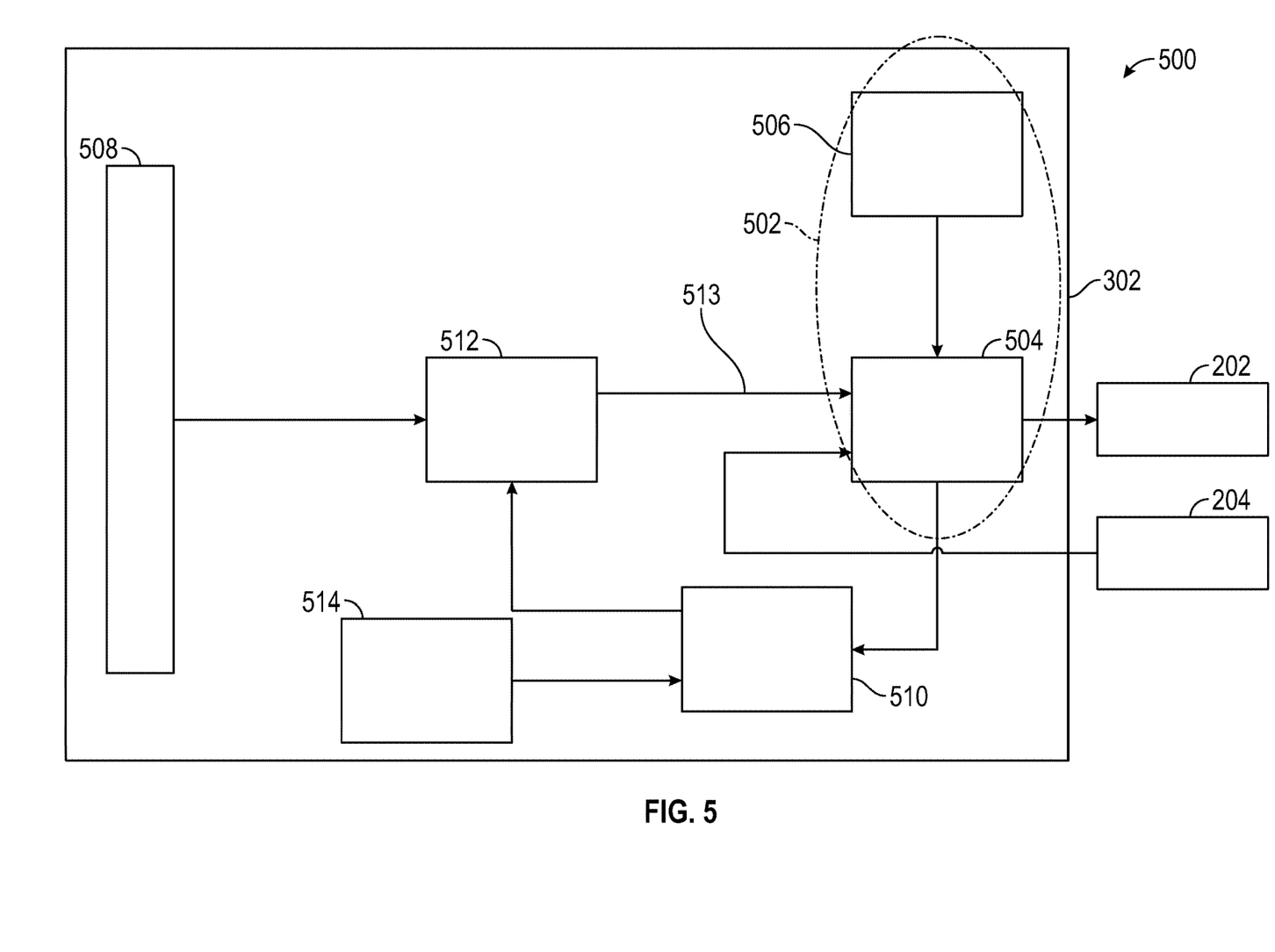
FIG. 5 is a block diagram showing various components of the escalation control module, in an embodiment.

FIG. 5 is a block diagram 500 showing various components of the escalation control system 302, in an embodiment. The escalation control system 302 includes a non-intelligent escalation module 502 including a driver attention escalation module 504 and a fault escalation module 506. The fault escalation module 506 can receive various fault signals from various diagnostic devices which include sensors, OnStar communication, driver monitoring systems, GPS data and map data. If a fault signal is present, the escalation control system 302 will deactivate the autonomous mode of the vehicle, and the fault escalation module 506 will send an escalation request to the driver attention escalation module 504. The driver attention escalation module 504 receives the escalation request and a driver attention state and sends an escalation signal or warning signal to the driver through the warning device 202 and asks the driver to take over control of the vehicle.

The escalation control system 302 further includes an External Condition Interpretation Module 508, a driver driving behavior awareness module 510 and an escalation threshold multiplier constructor 512. The External Condition Interpretation Module 508 receives the external parameters (i.e., traffic state parameter, weather state parameter, lighting parameter) and interprets and generates an intelligent escalation factor ($\lambda_E$). In various embodiments, the external parameters are placed in an interpretation matrix and calculations are performed on the interpretation matrix to generate the intelligent escalation factor, $\lambda_E$. The matrix can be a fuzzy logic matrix. The External Condition Interpretation Module 508 receives the external parameters on a periodic basis (e.g., once per second) and outputs a corresponding intelligent escalation factor on the periodic basis.

The driver driving behavior awareness module 510 observes, via the driver monitor 204, a response or attentiveness of the driver to the escalation signal or warning signal and stores the driver driving behavior history parameter through a trip or a time duration for driving the vehicle. The driver driving behavior awareness module 510 can receive a driver facial identification 514 to identify the driver behavior with previous behavior by the driver. The facial recognition software can further be used to determine the attentiveness of the driver. The driver driving behavior awareness module 510 receives the driver driving behavior history parameters such as trip escalation signal and a trip escalation count stored in the system as well as data regarding the driver's attentiveness level from the driver monitor 204 and determines a behavioral disciplining factor ($\lambda_D$) from this data.

The escalation threshold multiplier constructor 512 receives both the intelligent escalation factor ($\lambda_E$) and the behavioral disciplining factor ($\lambda_D$) and determines an escalation threshold multiplier 513 that can be supplied to the driver attention escalation module 504 to affect the operation of the non-intelligent escalation module 502. In various embodiments, the escalation threshold multiplier 513 is a product of the intelligent escalation factor and the behavioral disciplining factor (e.g., $\lambda_E \times \lambda_D$).

The escalation threshold multiplier can be a number within a suitable range. In various embodiments, the intelligent escalation factor could be between 0.1 and 16. Similarly, the behavioral disciplining factor $\lambda_D$ can be a number within a suitable range such as, for example, 0 and 1. Therefore, the escalation threshold multiplier 513 is generally a number between 0.1 and 16. The escalation threshold multiplier 513 is employed at the driver attention escalation module 504 in order to modify in the escalation process.

The driver attention escalation module 504, driver driving behavior awareness module 510, and the escalation threshold multiplier constructor 512 provide information to each other in a loop. A response to the escalation signal from the driver attention escalation module 504 is observed at the driver driving behavior awareness module 510, which generates the behavior disciplining factor. The behavior disciplining factor is input to the escalation threshold multiplier constructor 512 which generates the escalation threshold multiplier 513. The escalation threshold multiplier 513 is used to control the driver attention escalation module 504 and thereby control the escalation process.

Figure 6:
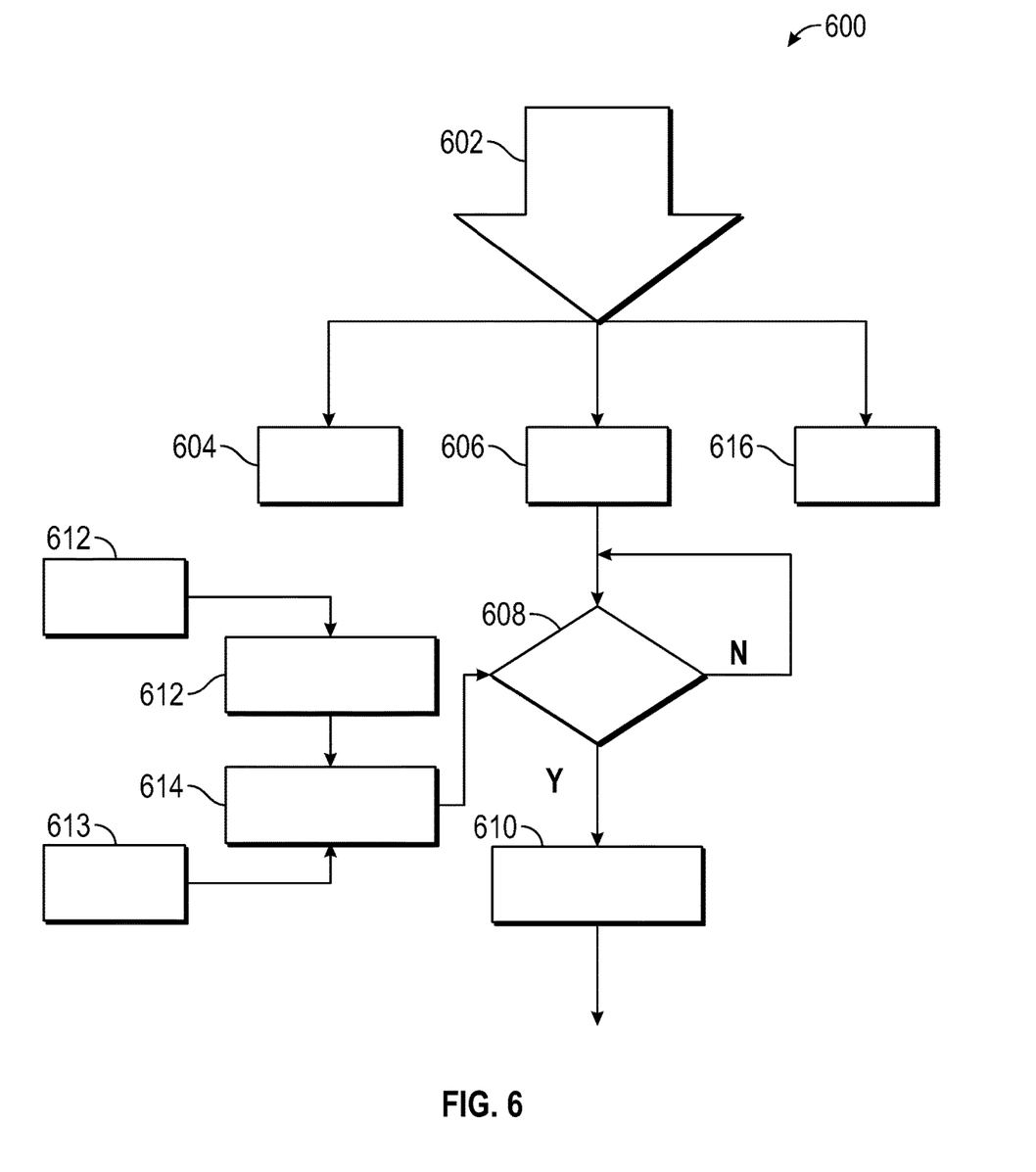
FIG. 6 shows a flowchart illustrating a method for controlling an escalation process in an embodiment.

FIG. 6 shows a flow diagram 600 of a process for driver attention escalation, generally being performed at the driver attention escalation module 504 of FIG. 5. At box 602 the driver attention state is provided to the driver attention escalation module 504 from the driver monitor 204. The driver attention state can be one of three possible states: "On Road" (box 604), "Off Road" (box 606), and "Unknown" (box 616). The "On Road" state indicates that the driver is actively monitoring the vehicle's progress. The "Off Road" state indicates that the driver is distracted or drowsy or is asleep. The "Unknown" state indicates a malfunction in the sensors for tracking the driver, such as an eye-tracking device due to the issues in camera hardware, or the control module, or both.

When the driver attention state is "On Road" (box 604), no escalation signal is provided. When the driver attention state is "Off Road" (box 606), a delay timer is started. In box 608, the timer is compared to the final escalation threshold. When the timer is less than the final escalation threshold, the method loops back into box 608, thereby continuously monitoring the timer. When the timer is greater than or equal to the final escalation threshold, an escalation process is started at box 610 and an alert message is sent to the driver to bring the driver's attention back to the road. The final escalation threshold can be adjusted using various parameters. In box 612, a speed 613 of the vehicle is received and a delay threshold is calculated based on the speed of the vehicle. In box 614, the escalation threshold multiplier 513 is multiplied by the delay threshold in order to obtain the final escalation threshold, which is then used in box 608 to control when the escalation process is started.

When the driver attention state is "Unknown" a standard fault escalation procedure can be activated.

Figure 7:
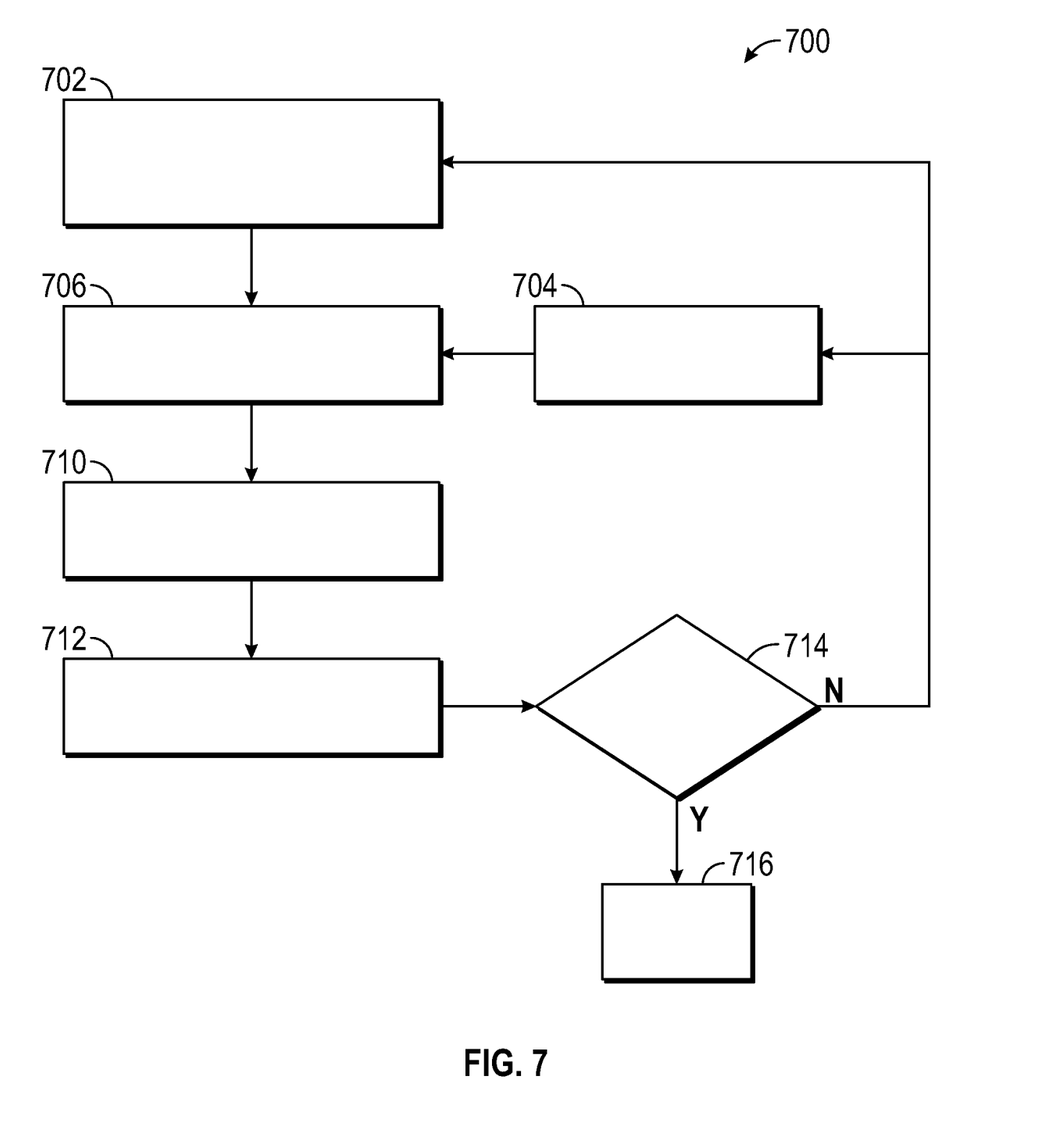
FIG. 7 shows a flowchart illustrating a method for controlling an escalation process in an embodiment.

FIG. 7 shows a flowchart 700 illustrating a method for controlling an escalation process in an embodiment. In box 702, an intelligent escalation factor is determined based on external parameters, such as traffic conditions, weather conditions and environmental lighting conditions. In box 704, a behavior disciplining factor is calculated based on the driver driving behavior history. The driver driving behavior history is used to prevent or reduce the occurrence of the driver misusing partial automation or conditional automation modes of the vehicle. In box 706, an escalation threshold multiplier is calculated based on the intelligent escalation factor and the behavior disciplining factor.

In box 710, the escalation strategy is escalated based on the escalation threshold multiplier determined in box 706 by applying the escalation threshold multiplier to operation of the non-intelligent escalation module 502, with vehicle speed taken into consideration. In box 712, the behavior, attentiveness or responsiveness of the driver to the escalation signal is monitored and recorded. In box 714, the method determines whether the driver has assumed control over the vehicle. If yes, then the method proceeds to box 716 where the method ends. If no, then the method returns to boxes 702 and 704 in order to determine updated values of the intelligent escalation factor and the behavior discipline factor. When the driver is non-responsive, the vehicle can operate in an autonomous mode in order to shut down by, for example, pulling over to a side of the road and shutting off.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating an autonomous vehicle, comprising:
    determine, by a processor, an intelligent escalation factor based on an external condition of an environment of the autonomous vehicle;
    generating, by the processor, a behavior disciplining factor based on a behavior history of a driver of the autonomous vehicle;
    generating, by the processor, an escalation signal to alert the driver based on the intelligent escalation factor and the behavior disciplining factor, a driver attention level and a speed of the vehicle;
    generating, by the processor, an escalation threshold multiplier formed by a product of the intelligent escalation factor and the behavior disciplining factor; and
    controlling, by the processor, the generation of the escalation signal by comparing a delay timer to a product of the escalation threshold multiplier and a delay threshold.

2. The method of claim 1, further comprising monitoring a response of the driver to the escalation signal and generating the behavior disciplining factor based on the behavior history of the driver to the escalation signal.

3. The method of claim 1, further comprising determining the intelligent escalation factor based on at least one of: a traffic condition; a weather condition and alighting condition.

4. The method of claim 1, further comprising wherein the delay threshold is a function of a speed of the vehicle.

5. The method of claim 1, further comprising updating the intelligent escalation factor and the behavior disciplining factor on a periodic basis.

6. The method of claim 1, further comprising operating the autonomous vehicle to shut down when the driver does not respond to the escalation signal.

7. A system for operating an autonomous vehicle, including:
    an external condition awareness module, operative on a processor, configured to determine an intelligent escalation factor based on an external condition of an environment of the autonomous vehicle;
    a driver driving behavior awareness module, operative on the processor, configured to generate a behavior disciplining factor based on a behavior history of a driver of the autonomous vehicle; and
    an escalation module, operative on the processor, configured to generate an escalation signal to alert the driver based on the intelligent escalation factor and the behavior disciplining factor, a driver attention level and a speed of the vehicle; and
    an escalation threshold multiplier constructor, operative on the processor, configured to generate an escalation threshold multiplier by forming a product of the intelligent escalation factor and the behavior disciplining factor,
    wherein generation of the escalation signal is controlled by comparing a delay timer to a product of the escalation threshold multiplier and a delay threshold.

8. The system of claim 7, further comprising a monitor configured to monitor a response of the driver to the escalation signal, wherein the driver awareness module generates the behavior disciplining factor based on the behavior history of the driver to the escalation signal.

9. The system of claim 7, further comprising at least one of a traffic conditions processor, a weather sensor and alighting sensor for indicating the external condition to the external condition awareness module.

10. The system of claim 7, wherein the delay threshold is a function of a speed of the vehicle.

11. The system of claim 7, wherein the external condition awareness module updates the intelligent escalation factor and the driver driving behavior awareness module updates the behavior disciplining factor on a periodic basis.

12. The system of claim 7, wherein the processor is further configured to operate the autonomous vehicle to shut down when the driver does not respond to the escalation signal for a pre-determined period of time after multiple incremental alert levels.

13. An autonomous vehicle, including:
an external condition awareness module, operative on a processor, configured to determine an intelligent escalation factor based on an external condition of an environment of the autonomous vehicle;
a driver driving behavior awareness module, operative on the processor configured, to generate a behavior disciplining factor based on a behavior history of a driver of the autonomous vehicle;
an escalation module, operative on the processor, configured to generate an escalation signal to alert the driver based on the intelligent escalation factor and the behavior disciplining factor, a driver attention level and a speed of the vehicle; and
an escalation threshold multiplier constructor, operative on the processor, configured to generate an escalation threshold multiplier by forming a product of the intelligent escalation factor and the behavior disciplining factor,
wherein generation of the escalation signal is controlled by comparing a delay timer to a product of the escalation threshold multiplier and a delay threshold.

14. The vehicle of claim 13, further comprising a monitor configured to monitor a response of the driver to the escalation signal, wherein the driver driving behavior awareness module generates the behavior disciplining factor based on the behavior history of the driver to the escalation signal.

15. The vehicle of claim 13, further comprising at least one of a traffic conditions processor, a weather sensor and a lighting sensor for indicating the external condition to the external condition awareness module.

16. The vehicle of claim 13, wherein the delay threshold is a function of a speed of the vehicle.

17. The vehicle of claim 13, wherein the external condition awareness module updates the intelligent escalation factor and the driver driving behavior awareness module updates the behavior disciplining factor on a periodic basis.

* * * * *